(12) United States Patent
Jaakkola et al.

(10) Patent No.: US 11,536,127 B2
(45) Date of Patent: Dec. 27, 2022

(54) APPARATUS, METHOD AND SOFTWARE PRODUCT FOR DRILLING SEQUENCE PLANNING

(71) Applicant: SANDVIK MINING AND CONSTRUCTION OY, Tampere (FI)

(72) Inventors: Veli-Pekka Jaakkola, Tampere (FI); Petri Nurminen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 17/011,682

(22) Filed: Sep. 3, 2020

(65) Prior Publication Data

US 2021/0404292 A1 Dec. 30, 2021

(30) Foreign Application Priority Data

Sep. 5, 2019 (EP) .................................... 19195649

(51) Int. Cl.
*E21B 44/00* (2006.01)
*E21B 7/02* (2006.01)
*E21B 41/00* (2006.01)
*G06Q 30/02* (2012.01)

(52) U.S. Cl.
CPC .............. *E21B 44/00* (2013.01); *E21B 7/022* (2013.01); *E21B 7/025* (2013.01); *E21B 41/00* (2013.01); *E21B 2200/20* (2020.05); *G06Q 30/0283* (2013.01)

(58) Field of Classification Search
CPC .......... E21B 7/022; E21B 7/025; E21B 7/028; E21B 44/00; E21B 44/02
See application file for complete search history.

(56) References Cited

U.S. PATENT DOCUMENTS

| 5,934,387 A | * | 8/1999 | Tuunanen | G01S 5/06 |
| | | | | 175/45 |
| 7,231,989 B2 | * | 6/2007 | Salminen | E21B 44/00 |
| | | | | 173/4 |
| 7,681,660 B2 | * | 3/2010 | Muona | E21B 7/022 |
| | | | | 173/4 |
| 7,931,096 B2 | * | 4/2011 | Saha | E21B 7/022 |
| | | | | 340/853.2 |
| 9,194,224 B2 | * | 11/2015 | Muona | E21B 44/02 |
| 9,951,616 B2 | * | 4/2018 | Uotila | E21B 7/025 |
| 10,174,614 B2 | * | 1/2019 | Puura | G05D 1/0274 |
| 10,233,753 B2 | * | 3/2019 | Hanski | E21B 7/022 |
| 2016/0348504 A1 | * | 12/2016 | Hanski | E21C 35/24 |
| 2017/0037725 A1 | * | 2/2017 | Uotila | E21C 35/24 |

FOREIGN PATENT DOCUMENTS

| AU | 2002346766 A1 | * | 6/2003 | ............. E21B 44/00 |
| AU | 2006263767 A1 | * | 1/2007 | ............. E21B 7/022 |
| AU | 2008237801 B2 | * | 12/2010 | ............. E21B 7/022 |

(Continued)

Primary Examiner — Frederick L Lagman
(74) Attorney, Agent, or Firm — Corinne R. Gorski

(57) ABSTRACT

An apparatus and method for planning a drilling sequence. The solution relates also to a rock drilling rig and to a computer program product. The apparatus searches several possible drilling scenarios for drilling a given drilling pattern. Different actions required by the scenarios have given costs and the executed algorithm calculates total costs of found scenarios. Scenarios with the lowest costs are selected.

14 Claims, 16 Drawing Sheets

(56) References Cited

FOREIGN PATENT DOCUMENTS

| AU | 2010237608 A1 | * | 11/2011 | ............ G06Q 10/06 |
| --- | --- | --- | --- | --- |
| AU | 2013390350 A1 | * | 12/2015 | ............ E21B 44/00 |
| AU | 2016331159 A1 | * | 4/2018 | ............ E21B 44/00 |
| AU | 2017285884 A1 | * | 1/2019 | ............ B25D 17/00 |
| AU | 2020243135 A1 | * | 10/2021 | ............ E21B 44/00 |
| CL | 201102562 | | 5/2012 | |
| CN | 105787137 A | * | 7/2016 | |
| EP | 3789579 | | 3/2021 | |
| WO | 03/48524 A1 | | 6/2003 | |
| WO | 2007/000488 A1 | | 1/2007 | |

* cited by examiner

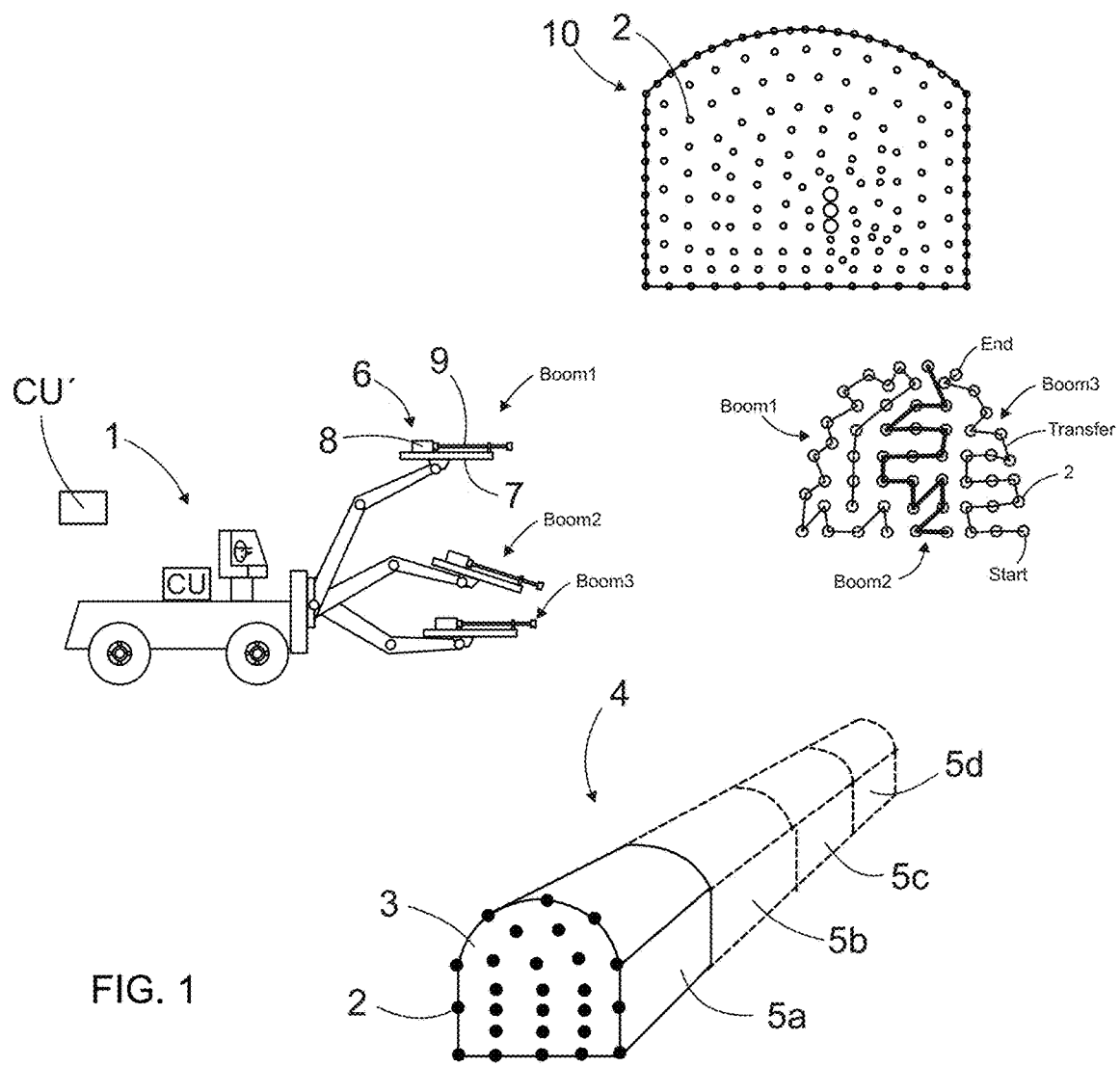
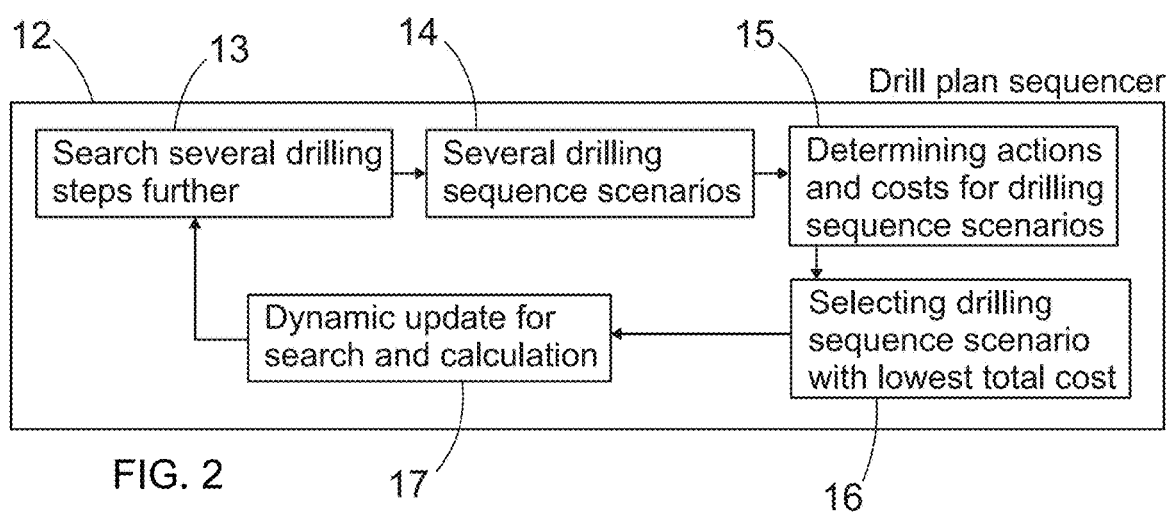
FIG. 2

US 11,536,127 B2

APPARATUS, METHOD AND SOFTWARE PRODUCT FOR DRILLING SEQUENCE PLANNING

RELATED APPLICATION DATA

This application claims priority under 35 U.S.C. § 119 to EP Patent Application No. 19195649.9, filed on Sep. 5, 2019, which the entirety thereof is incorporated herein by reference.

TECHNICAL FIELD

The present disclosure relates to an apparatus for planning a drilling sequence for a rock drilling rig. The present disclosure further relates to a rock drilling rig, a method for drilling sequence planning and a computer program product.

BACKGROUND

In mines and at other work sites rock drilling rigs are used for drilling drill holes to rock surfaces. The drilling is typically executed according to a pre-designed drilling plan. The drilling plan may be a drilling pattern defining positions, directions and lengths of several drill holes intended to be drilled for one round. When the drilling of the designed drilling pattern is executed, selection of drilling order has an important role for efficiency of the drilling. The same applies also for the selection of the boom, i.e. which boom and drilling unit is directed to which drill hole during the drilling process. It is known to pre-design drilling sequences for defining the drilling order and the boom selection. However, the known drilling sequences are made in an office environment and have been shown to contain numerous disadvantages.

SUMMARY

An object of the present disclosure is to provide a novel and improved apparatus and method for designing a drilling sequence for a rock drilling rig provided with several drilling booms. A rock drilling rig and a computer program product is also disclosed.

One aspect of the disclosed solution is to provide an apparatus for planning a drilling sequence for a rock drilling rig comprising two or more drilling booms, which are provided with drilling units for drilling drill holes to a rock surface. The drilled holes are blast holes. The apparatus includes one or more control units, each of having a processor for executing a drilling sequence planning program. The control unit is provided with a drilling pattern including drill hole data on drill holes to be drilled, and is provided with data on drilling booms. The drilling sequence for the input drilling pattern is generated by the drilling sequence planning program and includes data on drilling order of the drill holes and selection of boom for drilling each drill hole. When generating the drilling sequence the control unit searches several drilling steps further for each drilling unit, and based on the search, produces several possible drilling sequence scenarios each of which defining different drilling order, drilling unit selection and transfers of the drilling units between neighboring drill holes. The control unit makes comparisons between the several scenarios and makes selections. In order to define valuations for the scenarios, the control unit is provided with rules for defining cost values for several possible actions of the drilling steps and the control unit detects actions required by the drilling steps of the scenarios. Further, the control unit calculates total costs for the scenarios based on the input rules and selects one drilling sequence scenario of the examined scenarios having the lowest total cost for the several following drilling steps.

According to the disclosed solution, the existing rock drilling capacity of the rock drilling rig can be utilized more effectively when the drilling sequence is planned smartly in accordance with the disclosed solution. In other words, significant improvements in productivity may simply be achieved with more efficient drill hole and boom selections and without a need to modify the physical devices. Improved control leads to better operational capability and results.

The improved ability to create adaptable, sophisticated and smart drilling sequences makes it easier to deepen automation in the rock drilling. When the algorithm takes care of the most suitable and profitable drilling order and boom selections, remote controlled and teleoperated drilling, as well as fully automated drilling, are much easier to implement.

Further, the disclosed solution may be retrofitted to the existing rock drilling rigs in order to improve their productivity without any updates to mechanical devices and components. It is self-evident, that this kind of updating directed only to the control unit and its programs is remarkably inexpensive compared to alternating updating situations where the updating includes changing new rock drilling machines, booms and other operative devices.

With the present solution the drilling sequence to be executed is determined only after several alternative drilling sequence scenarios are examined by the control unit. This way "sight distance" is longer and optimization is more reliable when a large number or alternative paths are considered from the undrilled or current drilling situation forwards.

Further, the disclosed solution for determining the drilling order is applicable for all drilling applications where drilling patterns and sequences are executed with two or more drilling booms. The solution is especially suitable for face drilling in tunneling where number of drill holes may be over hundred and the drilling is executed with drilling jumbos provided typically with three drilling booms. However, the solution may also be utilized in other drilling applications, such as in long hole drilling etc.

According to an embodiment, the searching process is executed simultaneously during the drilling process. In other words, the drilling sequence is not at first planned and then executed. Thus, possible changes in the drilling and circumstances can be easily taken into consideration for the remaining part of the drilling pattern.

According to an embodiment, the at least one control unit for searching the drilling scenarios and generating the drilling sequence is located on the rock drilling rig. Thereby, the sequence is produced onboard the rock drilling rig and not at an office as is done conventionally.

According to an embodiment, the following search principles are also utilized: each following step depends upon the step before it, and the search does not end back at the same drill hole.

According to an embodiment, the solution implements a non-greedy searching algorithm. In other words, the algorithm may pick second best or even worse drilling steps to be executed next, since the algorithm aims for good drilling steps later. Thus, the algorithm looks far away, not only to next or shortly following drilling steps. In other words, the disclosed solution does not necessarily optimize the subsequent selection of drill hole, but instead it tries to optimize a wider portion of the drilling pattern or sometimes even the entire drilling pattern. The implementation of the algorithm is characterized by this non-greedy feature and this feature may also be recognized by it when examining the search process.

According to an embodiment, the principle of the searching process may be, in a way that, the control unit sets prices for each searched drilling sequence scenarios and considers the cheapest scenario to be optimal for the purpose. Then costs of single transitions and other actions are not significant. The searching algorithm has the ability to consider larger entities and value their costs.

According to an embodiment, the apparatus implements AI artificial intelligence when seeking advantageous order of drilling of a drilling pattern. The apparatus may implement one or more Graph and tree search algorithms Thereby the search may be based on an A* search algorithm, for instance. The algorithm may also be called as a search program or pathfinding computer program, and the program may implement heuristics. As an alternative to the mentioned A*, Dijkstra, or another suitable and commercially available program may be implemented for the purpose.

According to an embodiment, the apparatus implements a heuristic algorithm. The heuristic algorithm may try initially every possibility at each step. However, the algorithm may stop the search at any time if the current possibility is already worse than the best solution already found. In such search problems, a heuristic can be used to try good choices first so that bad choices can be eliminated early. The ability to limit the searches means that some possibilities will never be generated as they are measured to be less likely to complete the solution. This has positive influences to speed of the search and to the required computing capacity since unnecessary computations are avoided.

According to an embodiment, the heuristic algorithm and method disclosed in the previous embodiment may accomplish its tasks by using search trees. However, instead of generating all possible solution branches, the heuristic selects branches more likely to produce outcomes than other branches. It is thereby selective at each decision point, picking branches that are more likely to produce solutions.

According to an embodiment, the apparatus implements the heuristic algorithm. The heuristic algorithm may be based on either experimental or real world data relating to the rock drilling. Further, the heuristic algorithm may have rules of thumb based on real-world observations or experience of skilled drilling personnel.

According to an embodiment, the drilling sequence planning program, or the search algorithm, is configured in a way to simulate the selection of the drill holes for the drilling booms from a starting situation several steps forward. In case the apparatus is provided with enough computing capacity, the apparatus may calculate or simulate the drilling pattern from a completely undrilled or current situation to a fully completed situation.

According to an embodiment, the search algorithm is configured to examine a selected number of forthcoming transitions following the current situation. Thereafter, the apparatus may define the drilling sequence for each drilling boom for 4-10 drilling steps forward, for example. In other words, the complete drilling pattern typically including over a hundred drill holes can be examined in several parts.

According to an embodiment, the control unit of the apparatus is configured to execute the search several times for the drilling pattern during the drilling process in order to seek for several new drilling sequence scenarios. The control unit calculates the total costs for the found new drilling sequence scenarios, compares their costs and detects which one of the drilling sequence scenarios has the lowest total costs. Finally, the control unit updates the selection of one drilling sequence scenario to be implemented next by selecting the drilling sequence scenario with the lowest total costs.

According to an embodiment, the apparatus is configured to update the drilling sequence actively. This way, the executed final drilling sequence is always different from the one planned initially at the beginning of the drilling of the drilling pattern. Thus, the initially planned sequence is updated multiple times during the drilling process. It should be appreciated that the number of the updates per one drilling pattern may be hundreds or even thousands when large sized drilling patters are concerned.

According to an embodiment, the control unit is configured to execute new searches automatically in accordance with propagation and status of the drilling of the drilling pattern. It is possible that the control unit executes automatic and nearly constant updating of the drilling sequence.

According to an embodiment, the control unit is configured to execute new searches towards the end of the drilling pattern where all drill holes are handled. The searches are made forwards as long as possible when taking into account the available time for the searches. The number of steps searched forwards to the goal depends on the capacity of the control unit and complexity of the drilling pattern, for example.

According to an embodiment, the control unit is configured to dynamically update the disclosed searching and updating processes in response to detecting at least one of the following incidences: drilling of any drill hole is completed; drilling of any drill hole is interrupted or failed; the operator has executed manual control step; a drilling unit has failed; the drilling pattern is updated; the rules of the data element are updated. In other words, the dynamic updating is initiated when one of the predetermined incidences occur during the drilling process. The listing of incidences triggering the updating may be amended on a case-by-case basis if needed.

According to an embodiment, the control unit is configured to compare during the cost calculation process intermediate costs of unfinished cost calculation of the drilling sequence scenarios to the already calculated total costs of drilling sequence scenarios. The control unit may interrupt the unfinished cost calculation of such drilling sequence scenarios, wherein the intermediate costs already exceed the previously calculated total costs thereby avoiding redundant calculation. Thus, the control unit monitors the production of the drilling sequence scenarios and limits the further processing only to situations when good outcomes are to be expected. This way available resources can be focused in a more effective manner.

According to an embodiment, the apparatus implements a graph and tree search algorithm. Then at least one data element includes heuristic rules defining at least costs for transitions of the drilling units.

According to an embodiment, the control unit is provided with an A* computer algorithm for searching the possible transitions between the drill holes of the drilling pattern. The control unit is also provided with heuristic rules for the algorithm. The algorithm calculates costs for the found transitions based on the heuristic rules. The algorithm is configured to generate several drilling sequence scenarios and to calculate total costs for at least part of them. Further, the algorithm is configured to select the scenario to be executed next, which has the lowest costs for several drill holes further.

According to an embodiment, the control unit is provided with at least one data element including pre-determined rules for defining cost values for transfers between the selectable neighboring drill holes.

According to an embodiment, the rules define that the transfer costs are the greater the longer the distances between the drill holes are. The distance component may have the highest priority of all components. During long transfers the actual drilling does not proceed, whereby it is justified to set higher costs for longer transfer distances.

According to an embodiment, the rules may define cost for the proximity of the two or more booms. Then the cost may be the greater the closer the booms are relative to each other. With this solution the drilling booms are controlled to operate as far as possible from each other so that they do not collide and do not hamper or block each other's operation.

According to an embodiment, the rules may also define other cost value components, which may be selectively input to the control unit. Thereby, it is possible to adjust the operation of the apparatus by changing the cost value components when the circumstances or operational condition of the rock drilling rig change.

According to an embodiment, the rules defining cost values for the transfers take into account minimum joint movement needed for the transition. The greater the number of joint movements necessary, the greater is a transition cost value component influencing to the total transition cost value, and vice versa. In this manner when only minor number of joints need to be moved the boom movement may be effective and fast.

According to an embodiment, the rules defining cost values for the transfers take into account speed of joint movements of joints of the drilling booms. The booms of the rock drilling rig have different type of joints having also different speed of joint movements. In other words, some of the joints can be moved faster than the other. The algorithm may determine which joints are required to be moved for reaching the selectable drill holes and may then consider their speed movements when determining the cost values for the transfers. When the transfer utilizes fast joints, then this transition cost value component is low and when slow joints are included, the cost value component is higher.

According to an embodiment, drilling times of drill holes of the drilling pattern are taken into account when determining cost values. Data on drilling times of drilling patterns of previous rounds may be stored and the stored data may be used for estimating drilling times of drill holes of following drilling patterns. Thus, empiric data may be utilized. The algorithm may take into consideration data on drilling times when selecting the drilling order. This way the drilling will proceed in a controlled manner and unnecessary and lengthy transfers may be avoided.

According to an embodiment, the algorithm is configured to take into account roll-over joint position required for the drilling booms for drilling the drill holes when determining cost value components of the drilling of selectable drill holes. This way, ability to position the drilling unit at a start point of each selected drill hole, and ability to then execute the drilling, are being assured, as well as possibility to drill the selectable neighboring drill holes with full capacity of the drilling booms. Further, ability to execute drilling of the drill holes with good quality and accuracy may also be considered, and data on this may be based on empiric data, modelling or simulation.

According to an embodiment, the algorithm is configured to take into account positions of one or more drilling tool change stations as well as estimated working life of the changeable drilling tools. Then the algorithm is configured to take into account the position of the change station as one point requiring the transitions. The algorithm may determine cost values for the different tool change situations and needs, and the algorithm may take the cost values into account when planning the drilling order. In general, the more tool changes are needed and the longer is the distance to the change station, the higher is the cost value component of the tool change for the drill hole.

According to an embodiment, the apparatus is provided with data on maximum allowable distance for searchable neighboring drill holes, whereby the generated drilling sequence scenarios comprise only transitions lengths of which are shorter than the maximum allowed distance. In other words, only drill holes locating at certain range are accepted as selectable neighboring drill holes. An advantage of this embodiment is that number of selectable neighboring drill holes following the previously drill hole is limited, whereby planning time may be shortened and calculation capacity of the processor may be lower. Further, this embodiment assumes that it is more efficient to try to avoid log transitions.

According to an embodiment, the apparatus may be set to take in the searching process into account only a limited number of neighboring drill holes. Thus, the searching process may then be simplified and quickened.

According to an embodiment, the control unit is provided with data on selection of initial drill holes determined for each drilling boom. Then starting drill holes for the booms are known by the control unit. The control unit is configured to search for each boom possible transfers from the initial drill holes to following neighboring drill holes within the reach of the booms. The search is repeated in several following rounds until all the drill holes of the face drilling pattern are included. Then the goal of the search is reached and the searching is terminated.

According to an embodiment, the selection of initial drill holes disclosed in the previous embodiment is executed manually by an operator.

According to an embodiment, the apparatus is configured to make the selection of initial drill holes automatically for each boom. The selection may be based on empiric data on drilling sequences of previous rounds, or it may be based on a heuristic rule, for example.

According to an embodiment the apparatus is configured to display the found drilling sequence scenarios as a graph on a display device by showing the found paths as lines between the drill holes. The found paths may also be called as routes and the drill holes may be called as nodes in this disclosed presentation. Further, the control unit may be provided with a simulation program or algorithm for simulating the search process and the planned execution of the drilling.

According to an embodiment, the drilling sequence planning procedure may be considered to be a kind of game wherein the aim is to drill all holes of a given drilling pattern with lowest possible costs and in accordance with given rules of the game. The game makes searches, suggests several possible decisions, calculates costs values for the decisions and makes selections based on the calculated costs.

According to an embodiment, the disclosed solution only relates to rock drilling rigs including two, three or even more booms. Each of the boom has its own reach area, which depends for example on dimensions and structure of the boom and also on mounting position of the boom on a carrier of the rock drilling rig. Typically the booms are moved in turns during the operation and it is very unusual that simultaneous transfers occur. When the transfers occur in turns, the calculation is quicker and easier, since number of possible alternative transfers are then limited.

According to an embodiment, the control unit may have one single computer or it may consist of several computers operating in co-operation. The control unit may be located onboard the rock drilling rig, or alternatively, the searching process may be executed in one or more control units external to the rock drilling rig and communicating with the onboard control unit via data transmission path.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE FIGURES

FIG. 1 is a schematic overall view of the disclosed solution and related features.

FIG. 2 is a schematic diagram showing basic principles of the disclosed planning procedure of the drilling sequence.

For the sake of clarity, the figures show some embodiments of the disclosed solution in a simplified manner. In the figures, like reference numerals identify like elements.

DETAILED DESCRIPTION

Figure 3:
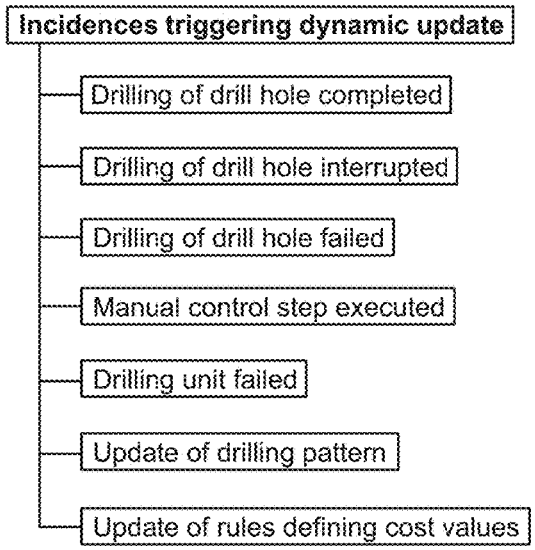
FIG. 3 is a schematic diagram showing some incidences which may cause dynamic update of the drilling sequence.

FIG. 1 shows a rock drilling rig 1 intended for drilling drill holes 2 to rock surface 3. The drilling may relate to tunnelling 4 wherein the drill holes 2 are blast holes drilled in several successive rounds 5a-5d.

The rock drilling rig 1 includes a movable carrier and several booms connected to the carrier, in this case three booms: Boom1, Boom2 and Boom3. At a distal end portion of the boom is a drilling unit 6. The drilling unit 6 may include a feed beam 7 and a rock drilling machine 8 supported thereon. A drilling tool 9 is connected to the rock drilling machine 8. Onboard the rock drilling rig 1 is at least one control unit CU for controlling the operation of the booms. The onboard control unit CU may also be configured to execute the searching algorithm disclosed in this document. The onboard control unit CU may communicate with one or more control units CU' external to the rock drilling rig 1.

The drilling is executed in accordance with a predesigned drilling pattern 10, which defines positions, lengths and directions of the drill holes 2, as well as the number of the drill holes 2. Based on the drilling pattern 10 a drilling sequence 11 defining drilling order of the drill holes 2 for each boom is designed. As can be noted the Boom1 operates at the left side, Boom3 on the right side and Boom2 in the middle, whereby the booms do not disturb each other. The drilling sequence may further determine start and end drill holes for each boom. Transfers between the drill holes 2 may be shown as lines when presenting the drilling sequence.

FIG. 2 discloses basic principles for planning the drilling sequence in accordance with the present solution. The drilling sequence planning program at 12, algorithm or drill plan sequencer, is configured to search at 13 several drilling steps further from the current drilling situation. The system looks further ahead but not necessarily till the end or goal. The search is made for all booms. Thereafter the program generates at 14 several alternative drilling sequence scenarios based on the possible drilling steps found in the search. Next, the planning program determines actions at 15 required for executing the scenarios and also determines costs for these actions in order to compare the different scenarios. When the cost comparison is complete the program selects 16 one scenario with the lowest total cost. The selected scenario is executed. Further, the program updates at 17 the planning process dynamically, whereby possible changes in circumstances and operability can be taken into account.

FIG. 3 discloses some actions or incidents, which may cause the planning program to update the drilling sequence. The triggering incidents may be determined beforehand and may be input to the control unit. The incidents listed in FIG. 3 have already been disclosed above in this document and are therefore not disclosed here in detail.

Figure 4:
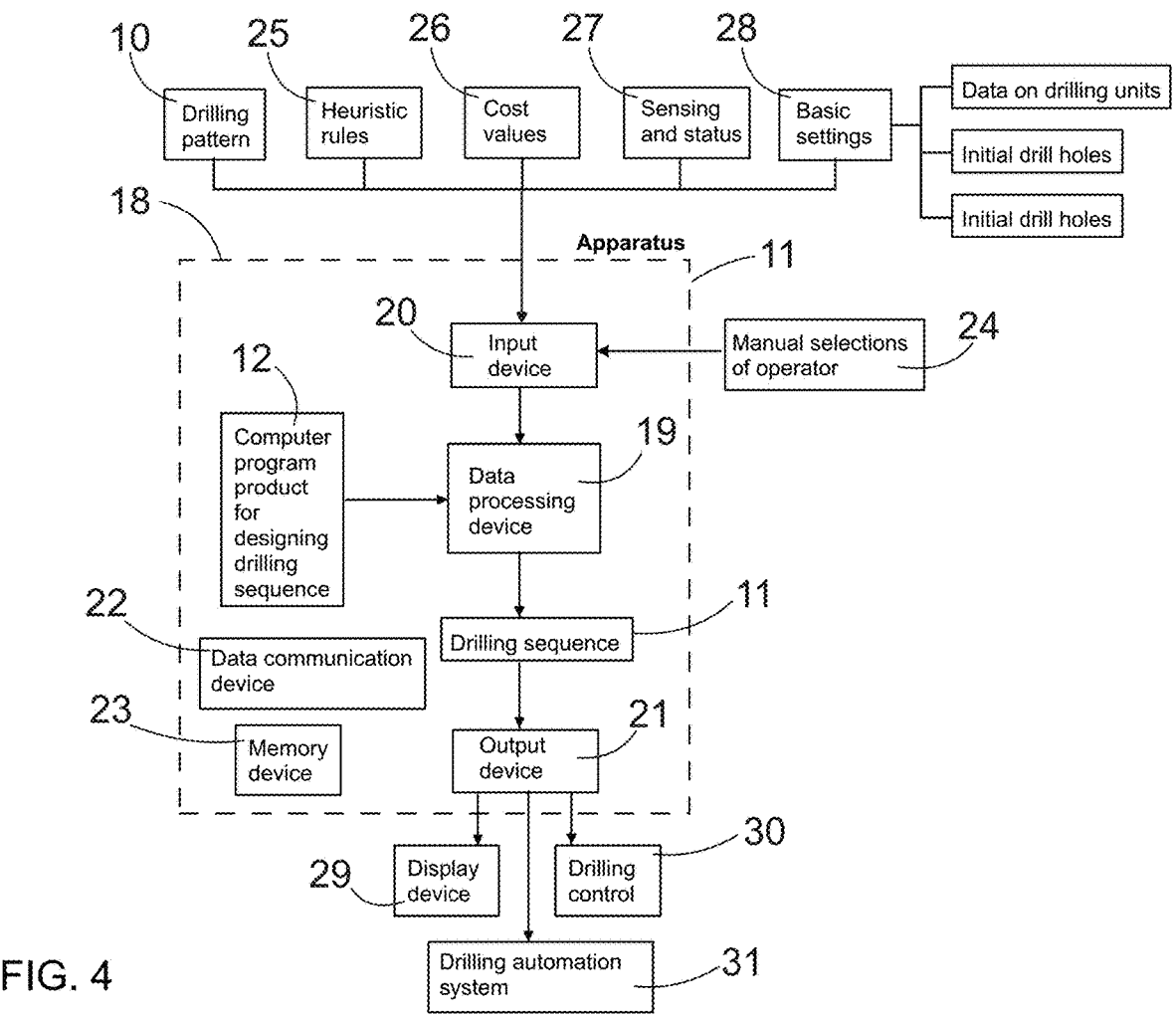
FIG. 4 is a schematic view of the apparatus intended for generating the drilling sequence.

FIG. 4 discloses some features and components relating to the apparatus 18 intended for drilling sequence planning. The apparatus 18 includes one or more processors or data processing devices 19, at least one input device 20 and at least one output device 21. The apparatus 18 may also include a data communication device 22 and a memory device 23. The disclosed planning algorithm or program 12 is input to the apparatus 18 and may be stored to the memory device 23. The apparatus 18 may communicate via the data communication device 22 with other control units, sensing devices and user interfaces. Control commands, selections and data input may be done manually by the operator 24 if needed. The input device 20 may also receive data on drilling pattern 10, data on heuristic rules 25, data on cost values 26, sensing and status data 27 and also data on basic settings 28. The basic settings 28 may include data on drilling booms and units and data on starting holes of the drilling sequence, as well as moving order of the booms. The sensing and status data may include data on operational condition of the drilling system and sensing data on circumstances and drilling characteristics, for example.

The apparatus 18 executes the algorithm in the processor 19 and takes into account the input data. The apparatus may display the generated drilling sequence on a display device 29 and it may communicate the drilling sequence to a drilling control device 30 of a rock drilling rig and may send sequence also to a drilling automation system 31.

Figure 5:
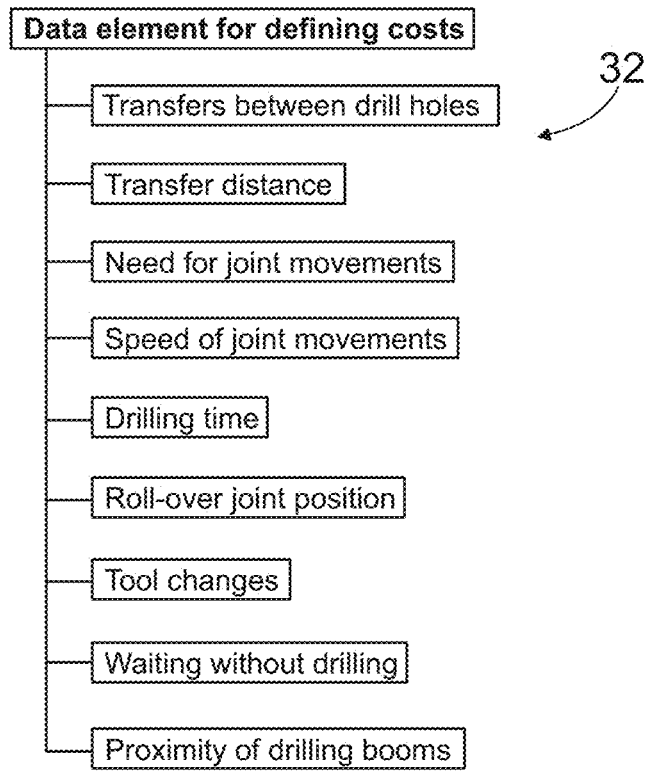
FIG. 5 is a schematic diagram showing some feasible cost value components which may be considered by the apparatus.

FIG. 5 discloses some cost value components 32, which may be considered when determining total costs of the found drilling sequence scenarios. The cost value components may be selected and adjusted case-by-case. Thereby, desired features can be prioritized and weighted relative to others. The cost values have been disclosed widely herein.

Figure 6:
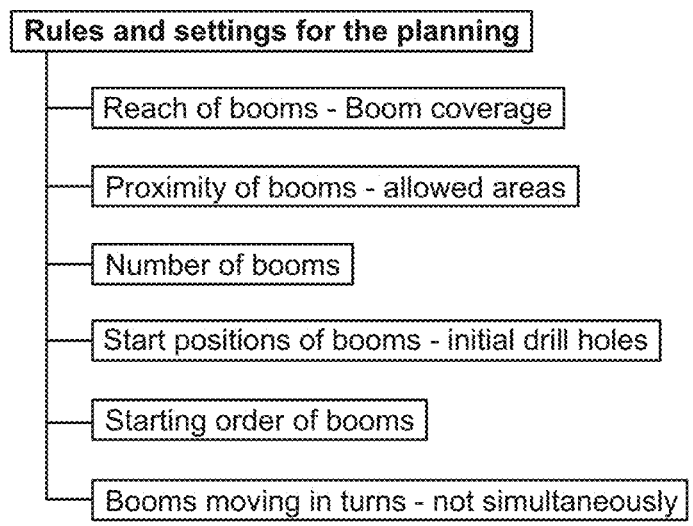
FIG. 6 is a schematic diagram showing some feasible rules which may be input to the apparatus as basic settings.

FIG. 6 discloses some basic settings and rules 28 for the planning Some of these rules are determined by the physical structure of the used rock drilling rig and some of them can be determined by the operator. The rules are discussed in more detailed elsewhere herein.

Figure 7:
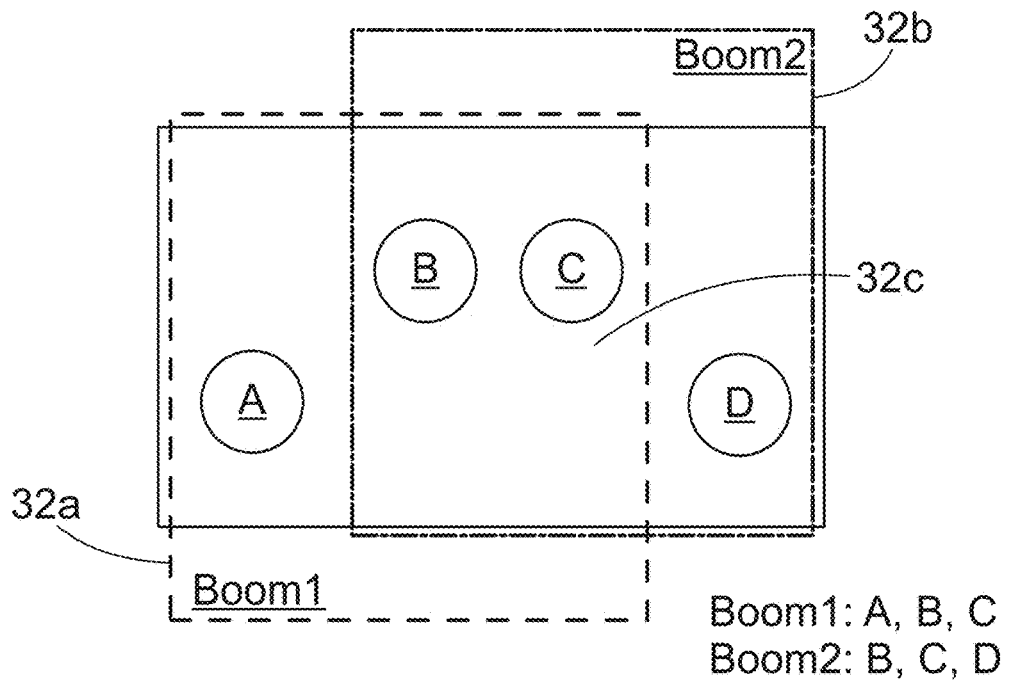
FIG. 7 is a schematic and simplified view showing four drill holes and reach areas of two drilling booms intended for drilling the holes.

FIG. 7 discloses a highly simplified arrangement wherein four drill holes A-D are drilled with two drilling booms Boom1 and Boom2. The Boom1 has a first area of coverage 32a and the Boom2 has a second area of coverage 32b. The areas 32a and 32b overlap partly whereby there is an intersecting middle area 32c where both booms can operate. However, in order to ensure collision free drilling, a rule may be input to the planning apparatus defining that the booms may not be simultaneously present at the middle area 32c. Of course, there may be other rules limiting free movement of the booms and selections of the drill holes. In the disclosed arrangement Boom1 can drill holes A, B and C, and Boom2 can drill holes B, C and D. This arrangement is used in the example disclosed in FIGS. 9-14.

Figure 8:
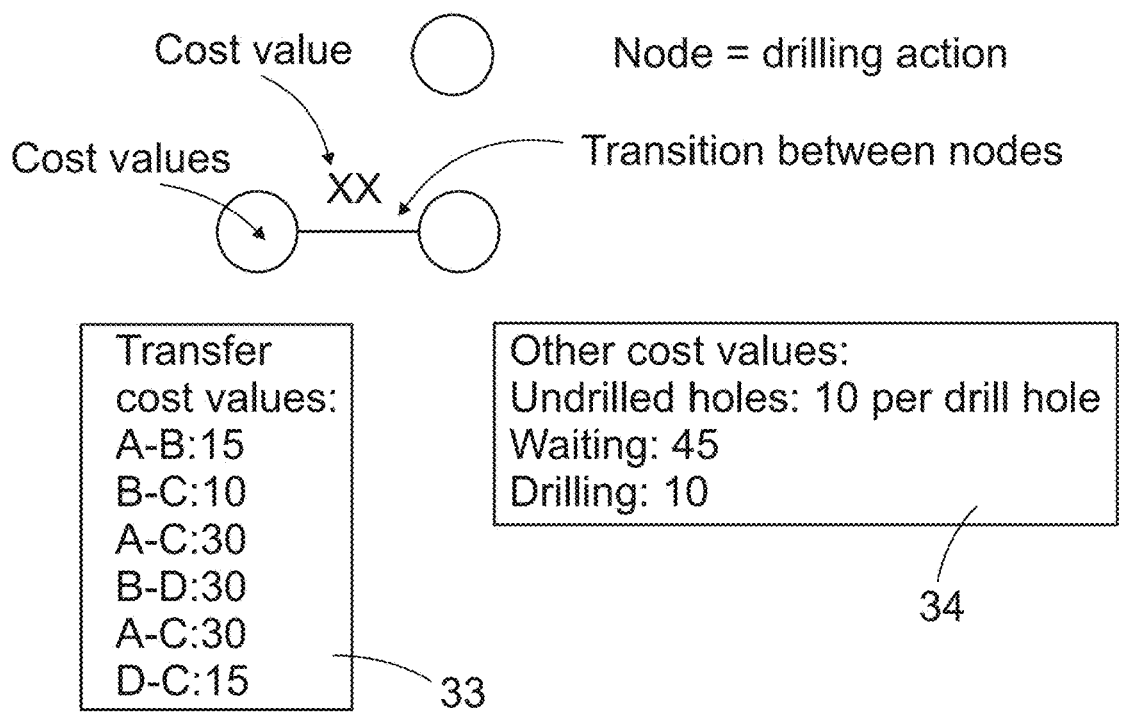
FIG. 8 is a schematic view showing some principles of graphical presentation of the drill holes and transitions between them, as well as disclosing some cost values implemented in the example shown in FIGS. 9-14.

FIG. 8 discloses that in a graphical presentation the nodes indicate drilling of drill holes and may be shown as circles. Transfers between the nodes are indicated as lines between the circles. In connection with the line may be indicated cost values. Also inside the circle cost values may be indicated, as will be shown in the referred example. Further, the apparatus is provided with data on transfer cost values 33 as well as other cost values 34. In this example, the transfer costs are the higher the longer is the transfer distance. Further, cost values may be set for other incidents such as waiting and drilling. It is understandable that the waiting has a higher cost than the drilling. In the example, the total cost has two components: 1) the cost of actions taken so far in the examined plan and 2) the optimistically estimated minimum remaining cost to drill all remaining cost.

FIGS. 9-20 disclose an example of a planning process utilizing a graph and tree search algorithm. The search steps are executed in turn and the process is started with the Boom1. Issues disclosed in the basic data and shown in FIGS. 7 and 8 are implemented in the example. The disclosed solution may be illustrated as a search tree including several branches with nodes and transfers between them. The algorithm may utilize a heuristic function, also called simply a heuristic, which may rank alternatives at each branching step based on available information to decide which branch to follow. Different branches are examined until all drill holes are drilled and the goal achieved.

Regarding initial locations of the booms, Boom1 is located initially at the drill hole A and the Boom2 is located initially at the drill hole D.

Figure 9:
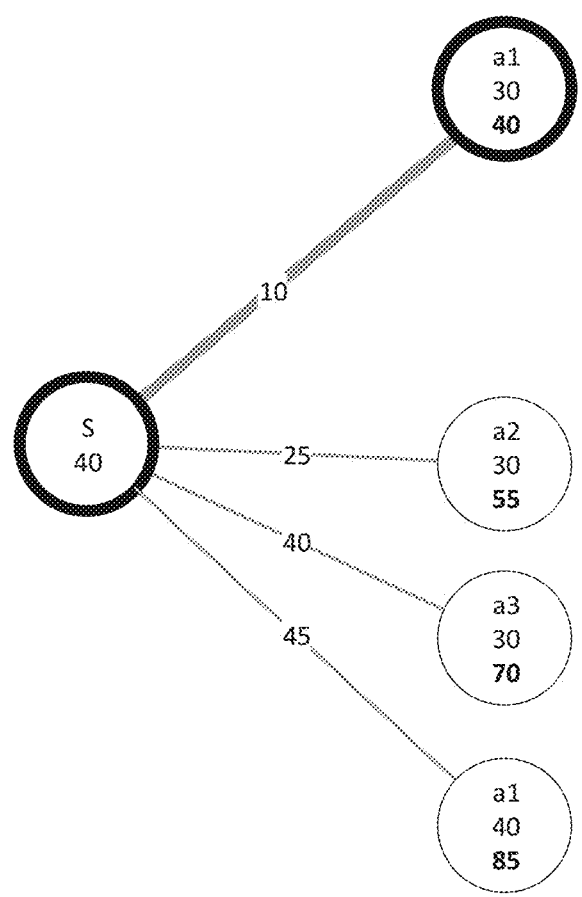
FIGS. 9-14 are schematic views showing searching and calculation steps of different drilling sequence scenarios for the simplified example situation of FIGS. 7 and 8.

In FIG. 9 different alternatives for the Boom1 are searched. When drill hole A is selected then the transfer cost is 0 since the Boom1 is already at the drill hole A. Drilling cost is 10 as shown in FIG. 8. A heuristic function defining cost for undrilled holes is 30 since after hole A drilled three holes are still undrilled. Then the total cost for the scenario a1 with the Boom1 and the hole A is 40 as is shown in FIG. 9. The holes B and C can be drilled with Boom1 whereby total costs 55 and 70 are calculated for them. Since the hole D is out of range Boom1 needs to wait causing extra costs and the total cost is then 85. The algorithm selects node a1 with total cost 40 since nodes a2-24 have greater total costs.

Figure 10:
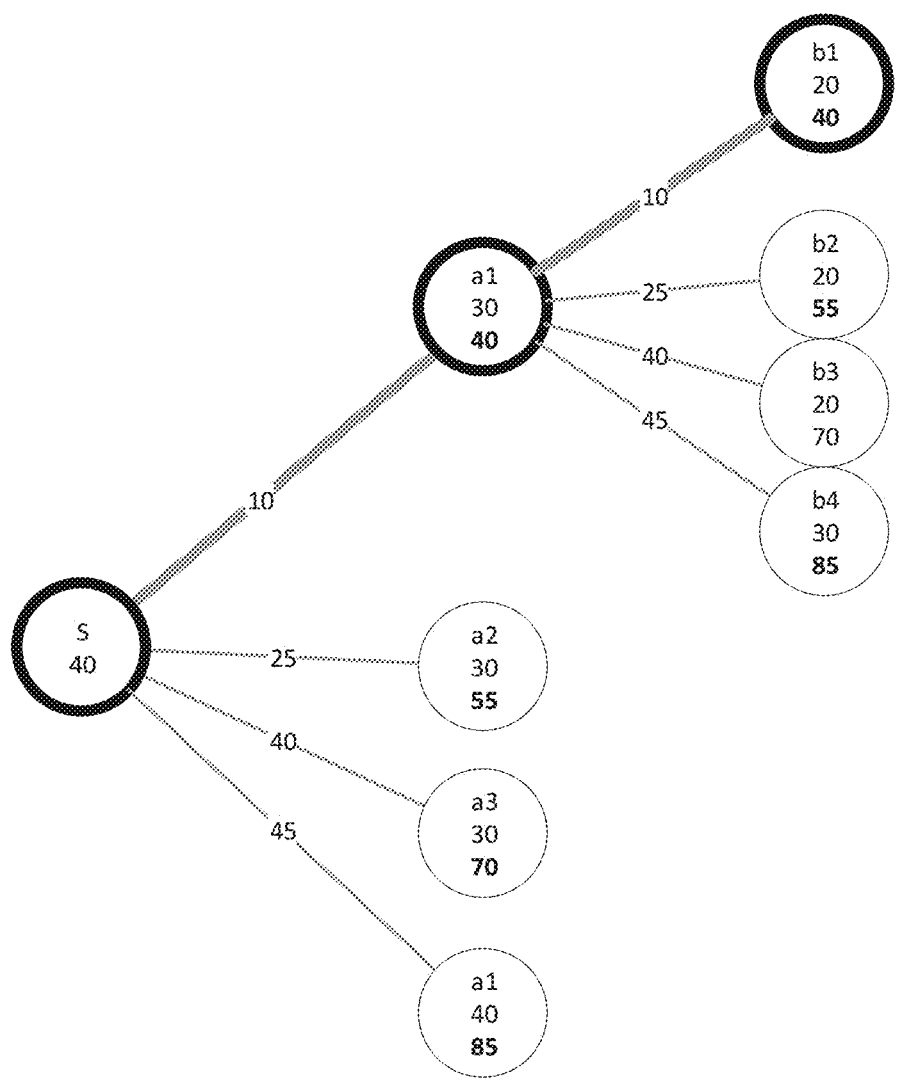
Figure 11:
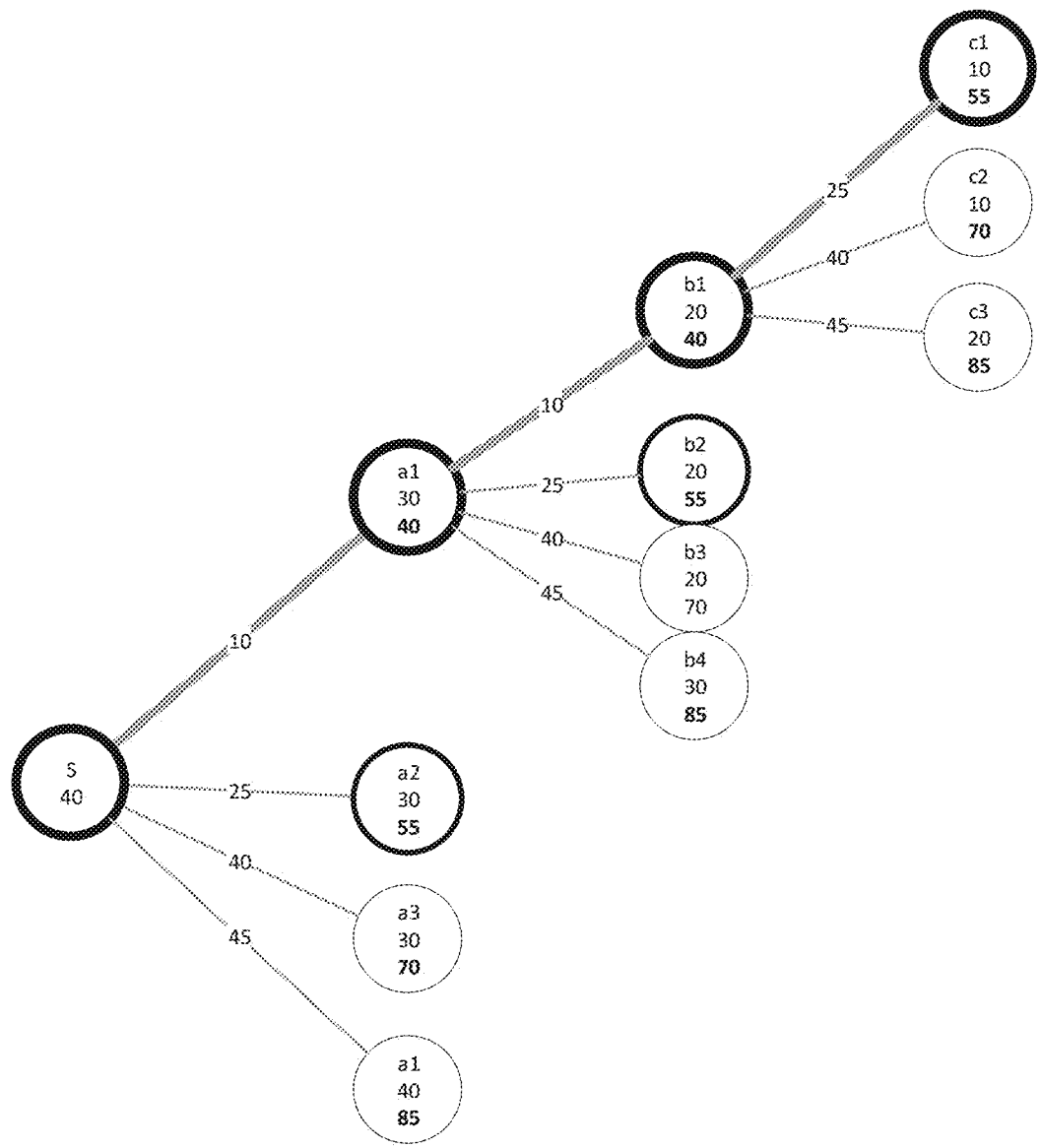

In FIG. 10 the searching process continues with selecting drill holes for the Boom2. The drill holes D, C and B are inside the range of the Boom2 whereby transfer costs and drilling costs can be defined for nodes b1-b3. The hole A is out of range and requires a waiting cost of which is 45 in node b4. As can be noted, the node b1 with the Boom2 and the hole D produces the lowest total cost value 40 and is therefore selected.

In FIG. 11 the Boom 1 has again the turn to move. The holes B and C are still undrilled whereby the algorithm searches nodes c1 and c2. The node c1 has a lower total cost value compared to the node c2 whereby node c1 is prioritized. In case Boom1 waits and passes drilling either of the remaining holes B and C then the total cost for a node c3 is 85. The node c1 with the Boom1 and the hole B has the lowest total cost 55 and is selected.

Figure 12:
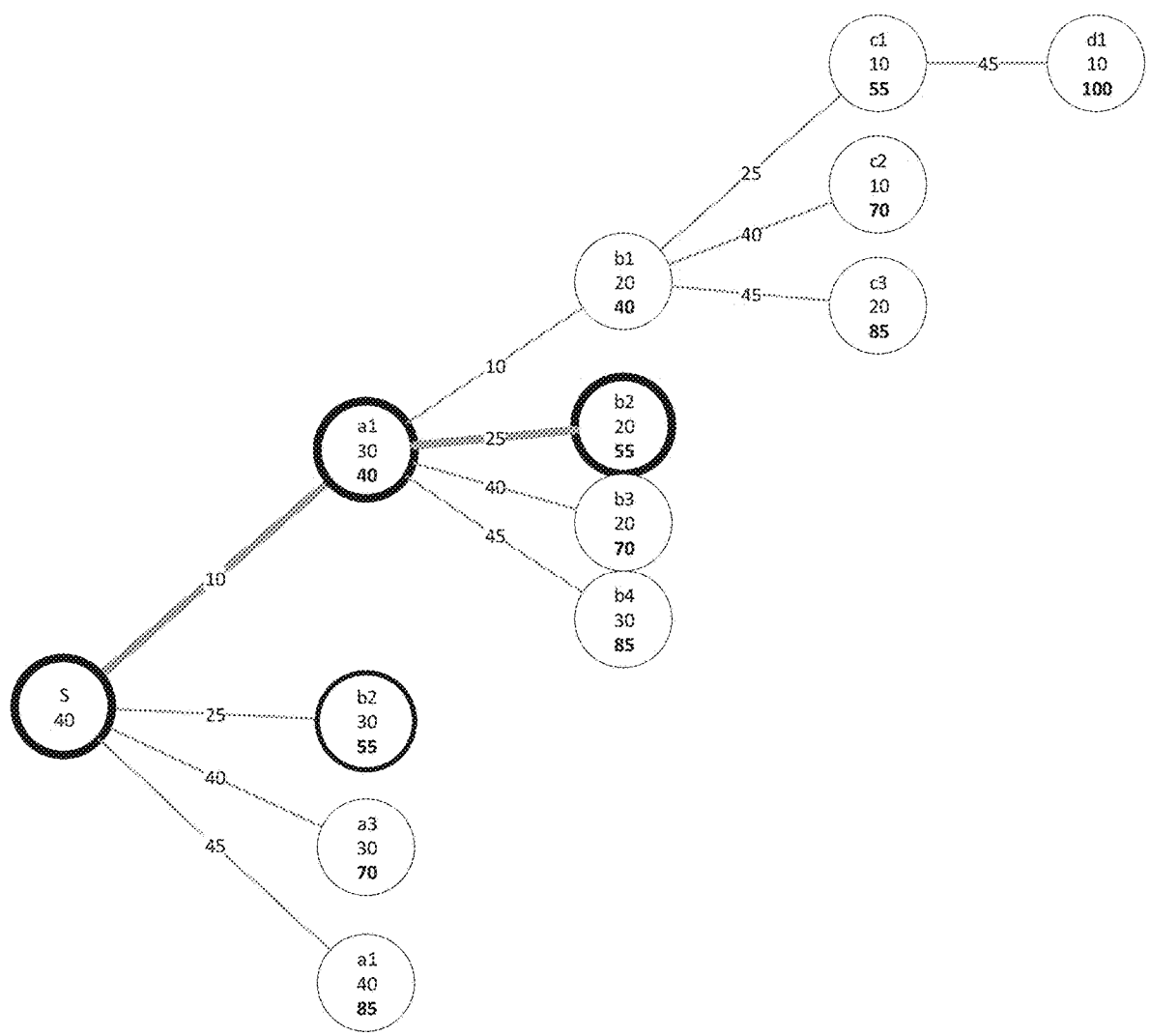

FIG. 12 discloses that the Boom2 is not allowed to select the remaining hole C since the Boom1 is drilling the hole B in the middle area 32c as shown in FIG. 7. The Boom1 and Boom2 may not be inside the middle area 32c at the same time, whereby the Boom2 can only wait, whereby the total cost value is 100. Then the algorithm returns back and examines nodes b2-b4, and selects b2 with the lowest total cost value 55.

Figure 13:
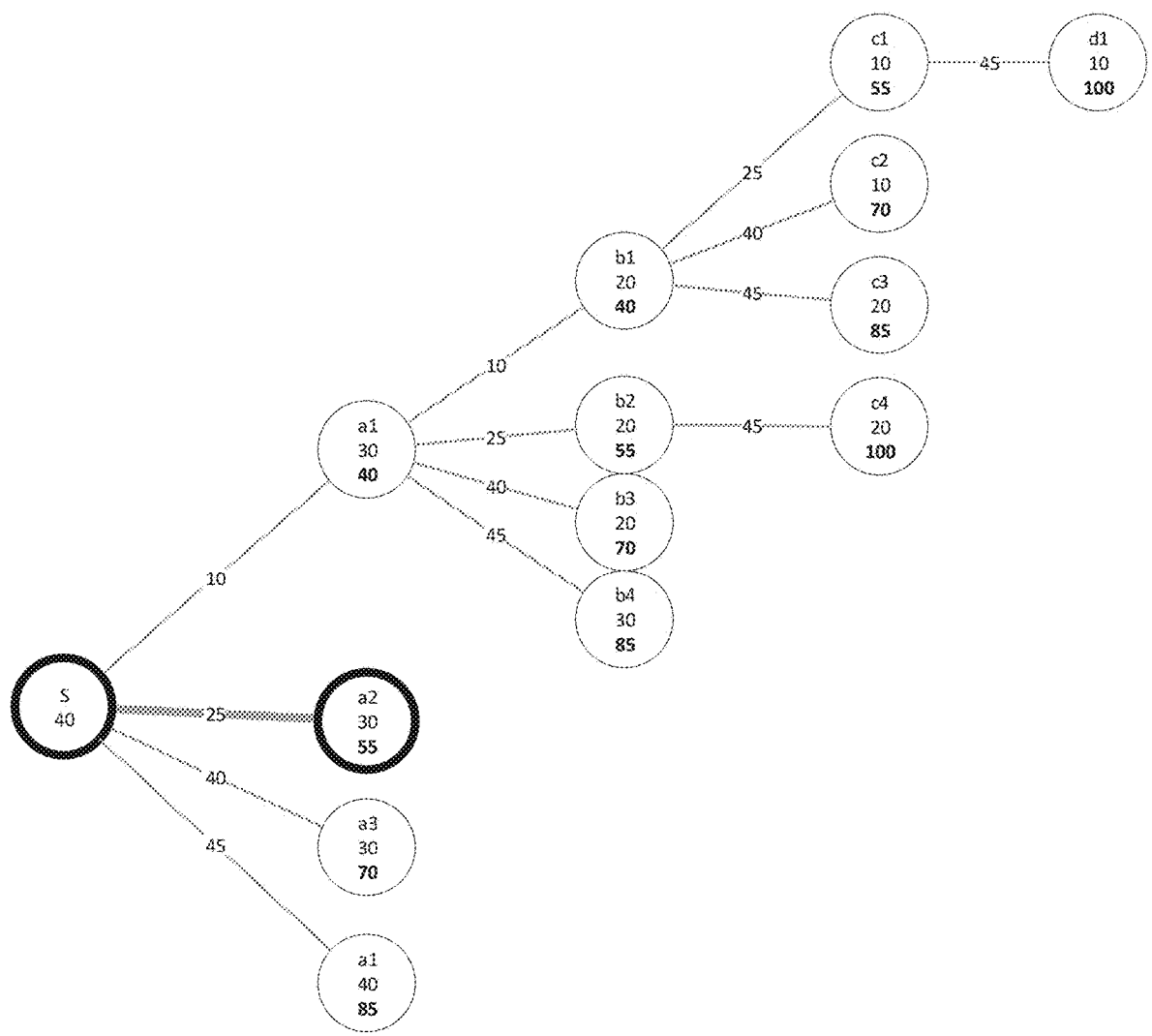

In FIG. 13 Boom1 cannot enter to the middle section since Boom2 is already there. Thus, Boom1 needs to wait and the total cost value is 100. Therefore, the algorithm returns back to earlier branches and selects the node a2.

Figure 14:
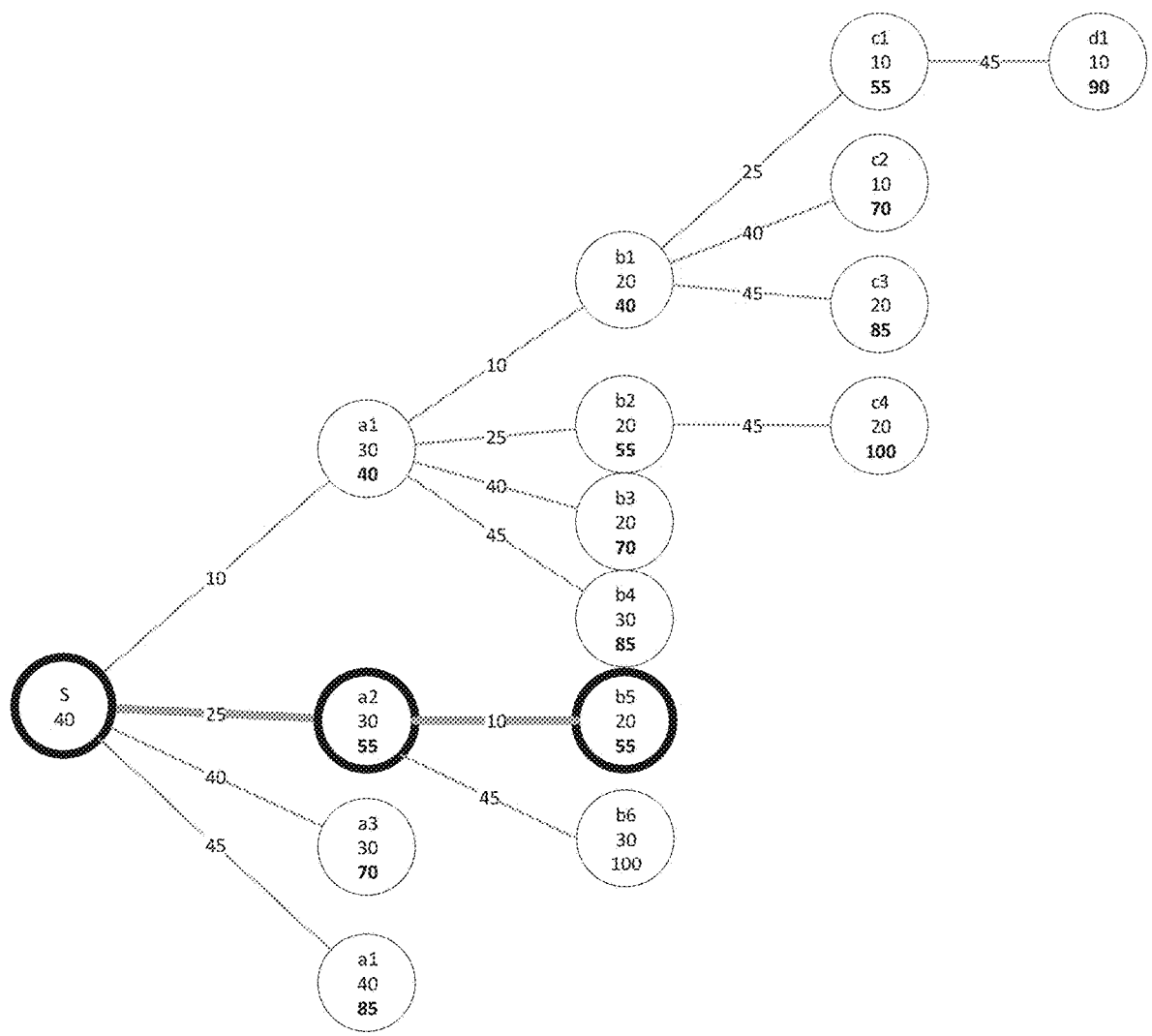

In FIG. 14 the algorithm selects hole D and a new node b5 is produced with the total cost value 55. This node is also the most attractive and is selected for next step.

Figure 15:
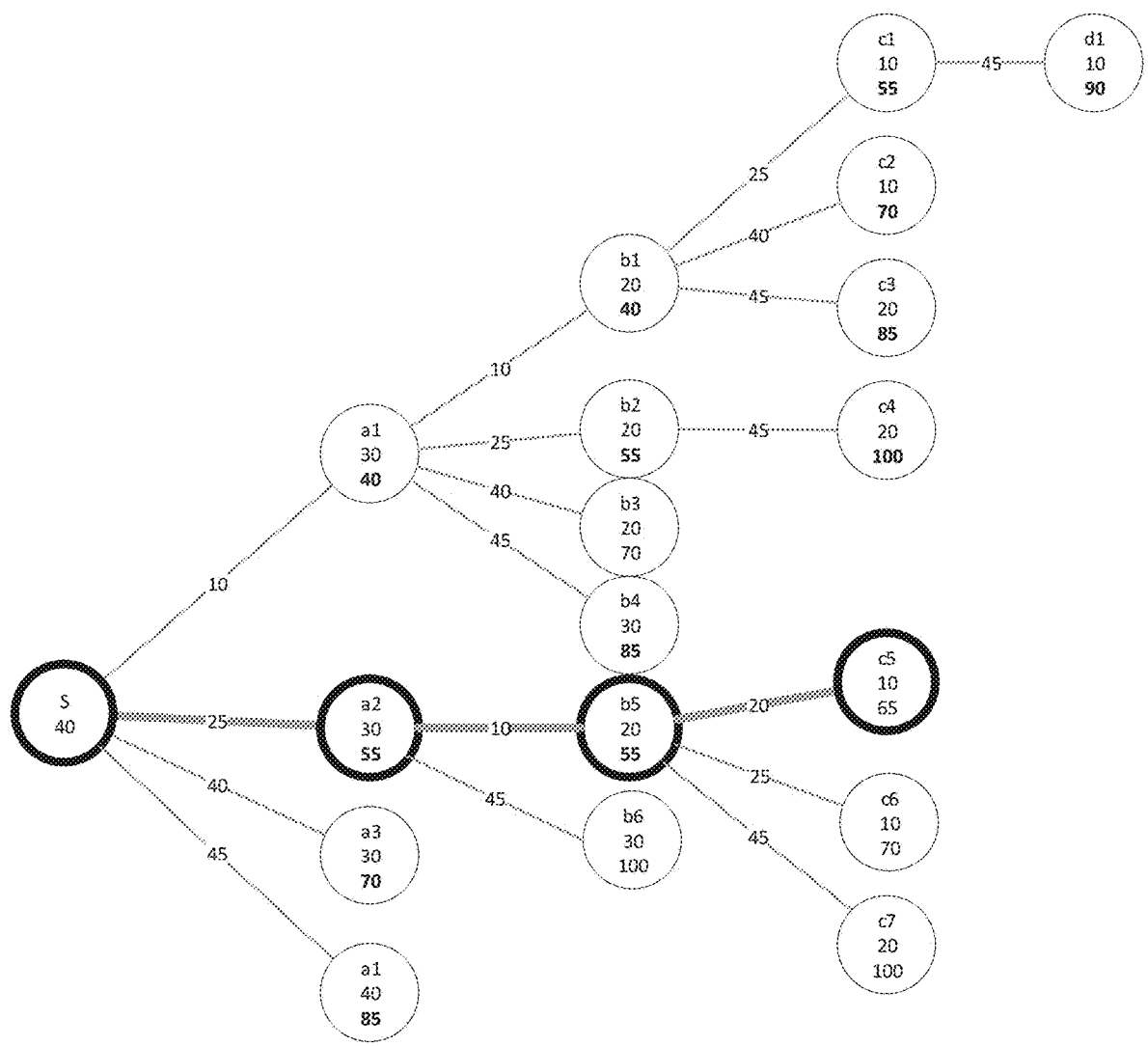
FIG. 15 is a schematic view showing a drilling sequence planning procedure for three drill holes and two drilling booms, and wherein proximity cost value is used as a heuristic function.

In FIG. 15 the successor nodes for b5 are shown. Boom1 can now either drill hole C c5, move to A, drill hole c6 or wait c7. Drilling hole C is the most attractive option.

Figure 16:
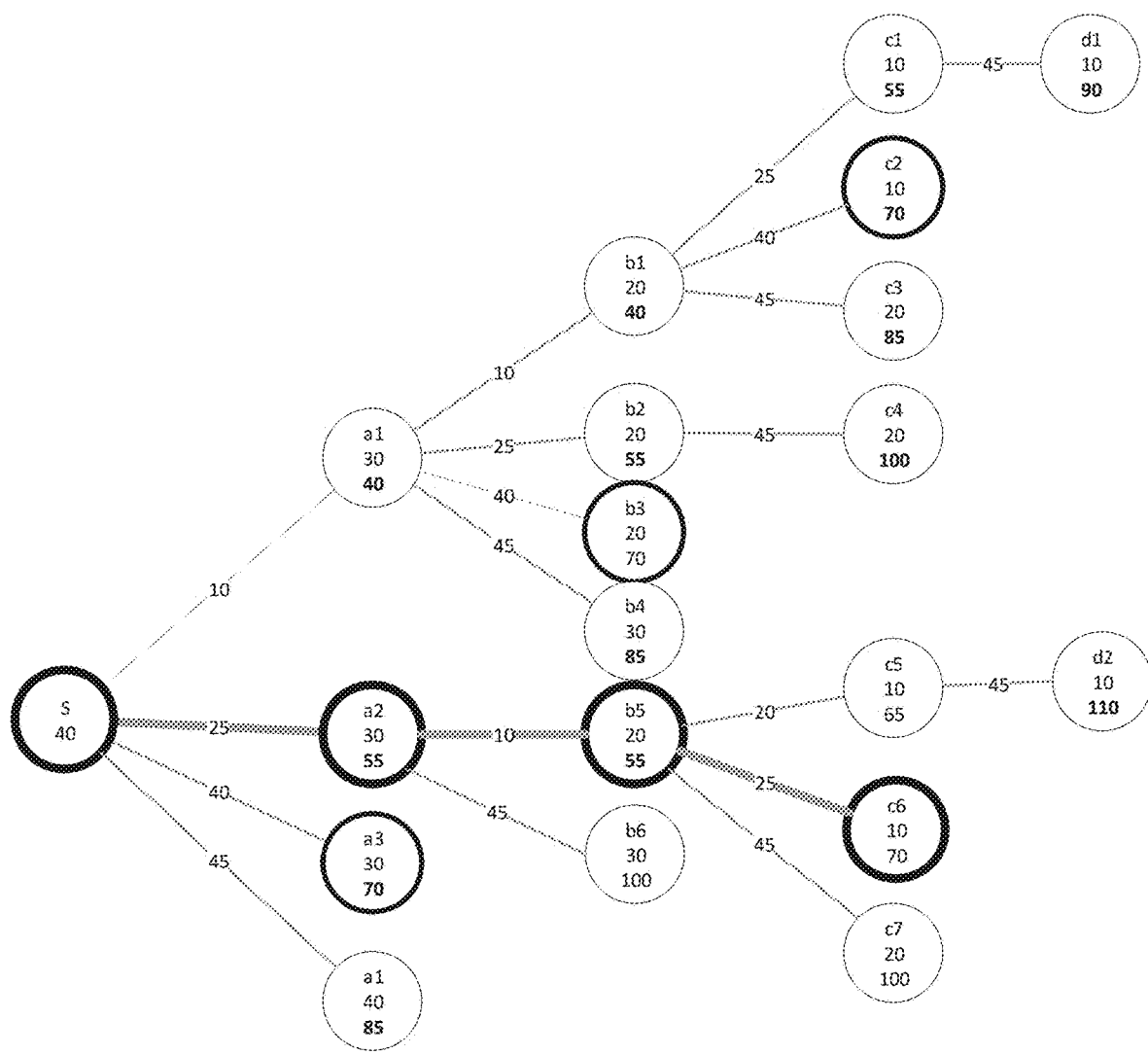
FIGS. 16-20 are schematic views illustrating different drilling sequence procedures.

In FIG. 16 it is shown that after c5 Boom2 can only wait, and for this reason nodes a3, b3, c2 and c6 are equally attractive. c6 is selected because it is the latest.

Figure 17:
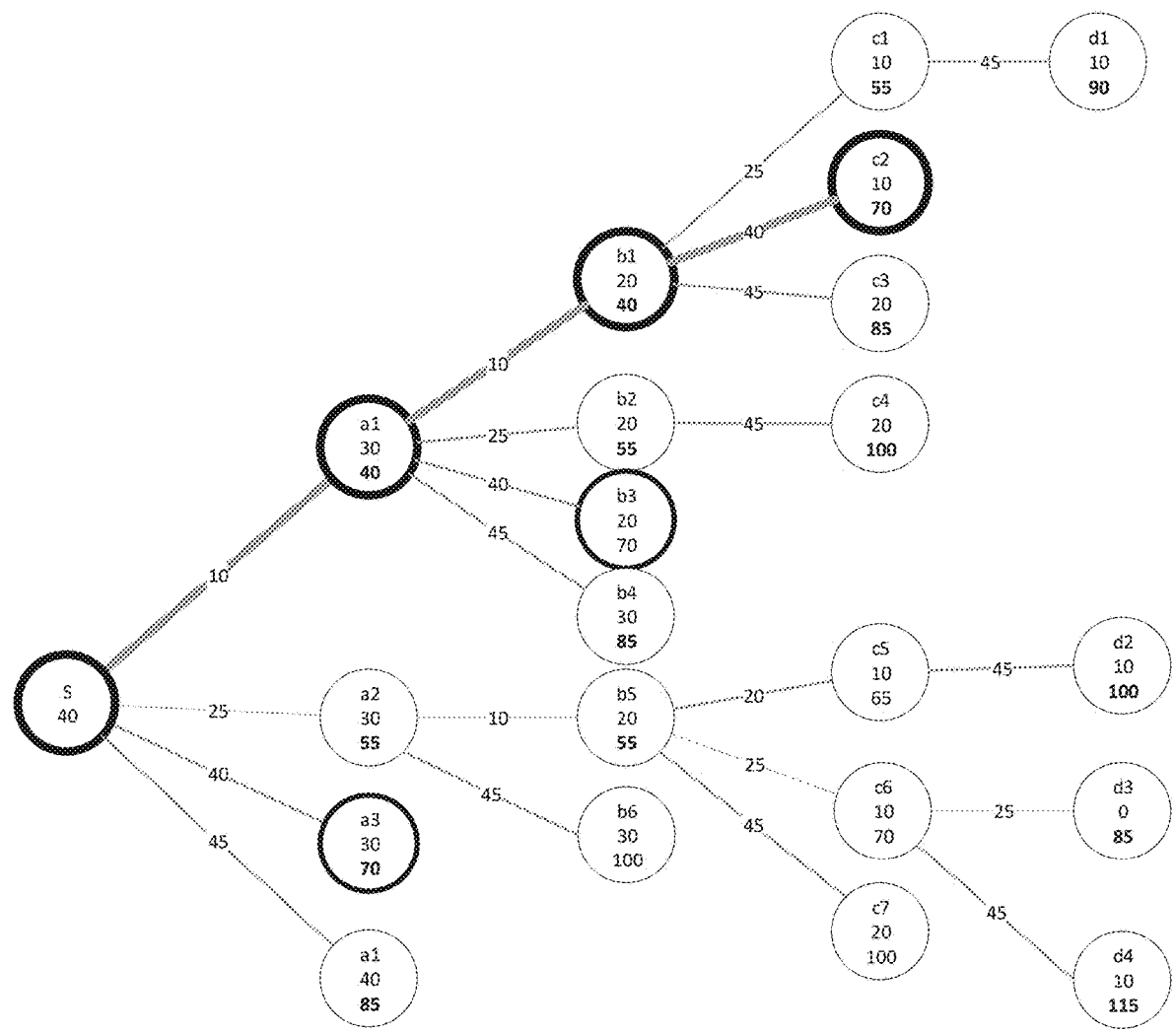

In FIG. 17 the successors d3 and d4 are presented. d3 means moving Boom2 to C, d4 means waiting for Boom2. At this point, total costs of the new nodes are so high that preceding nodes a3, b3 and c2 are more attractive. c2 is selected because it is the latest.

Figure 18:
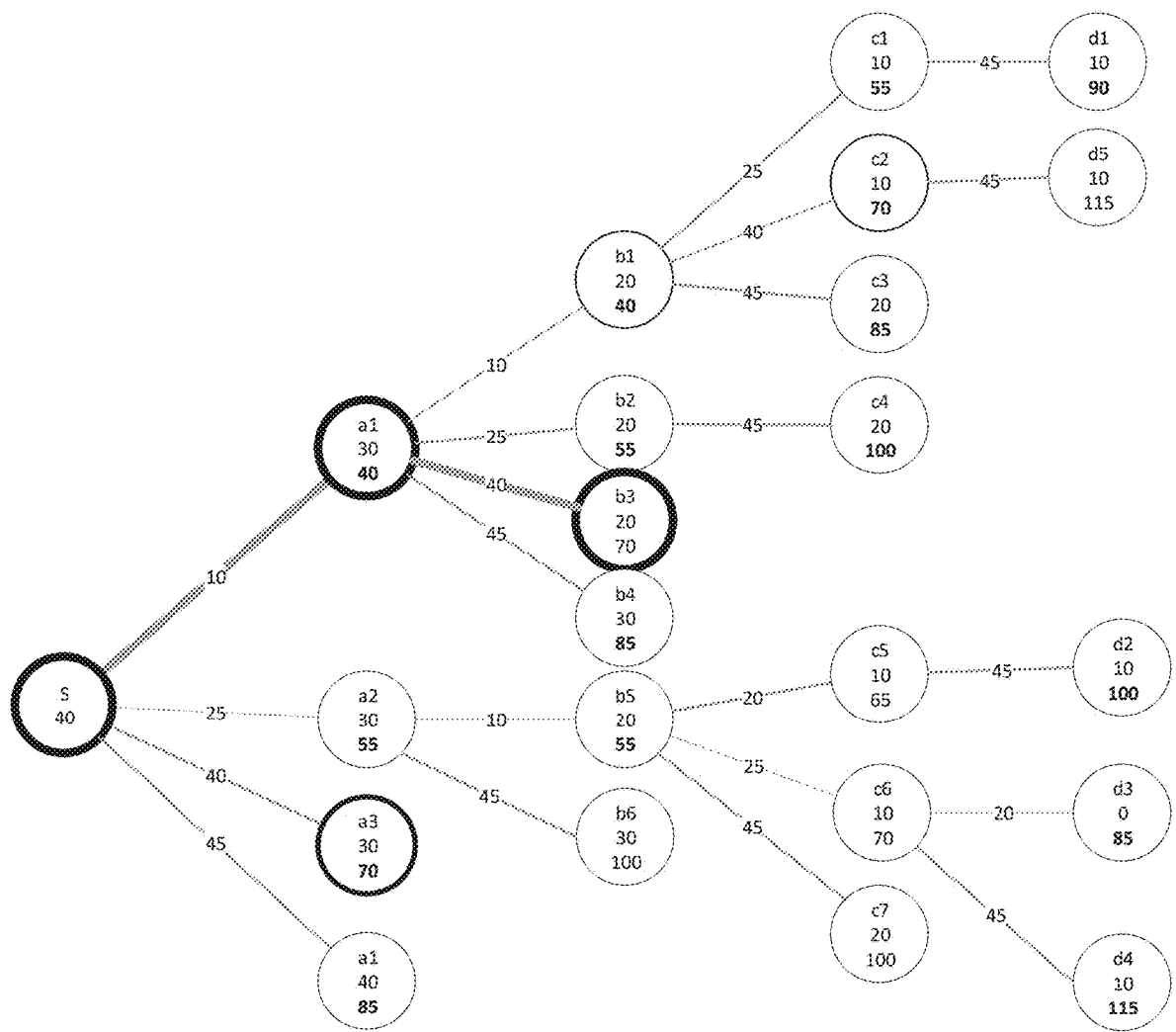

In FIG. 18 it is shown that after c2 only a waiting option is available for Boom2. b3 and a3 are more attractive, whereby the algorithm falls back to b3.

Figure 19:
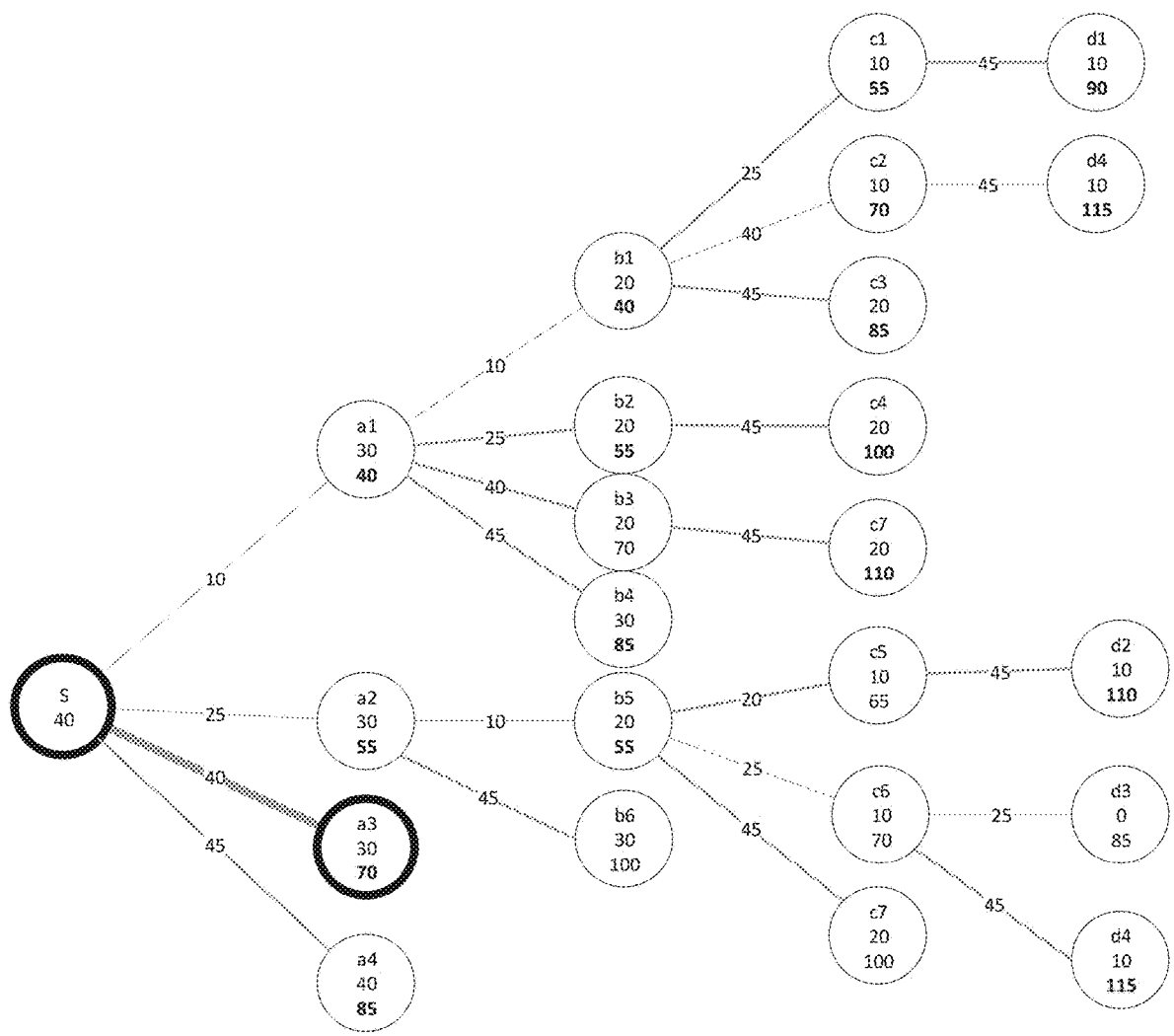

In FIG. 19 the only successor for b3 is to wait (c7) and it is not attractive. Algorithm selects a3 for the further examination.

Figure 20:
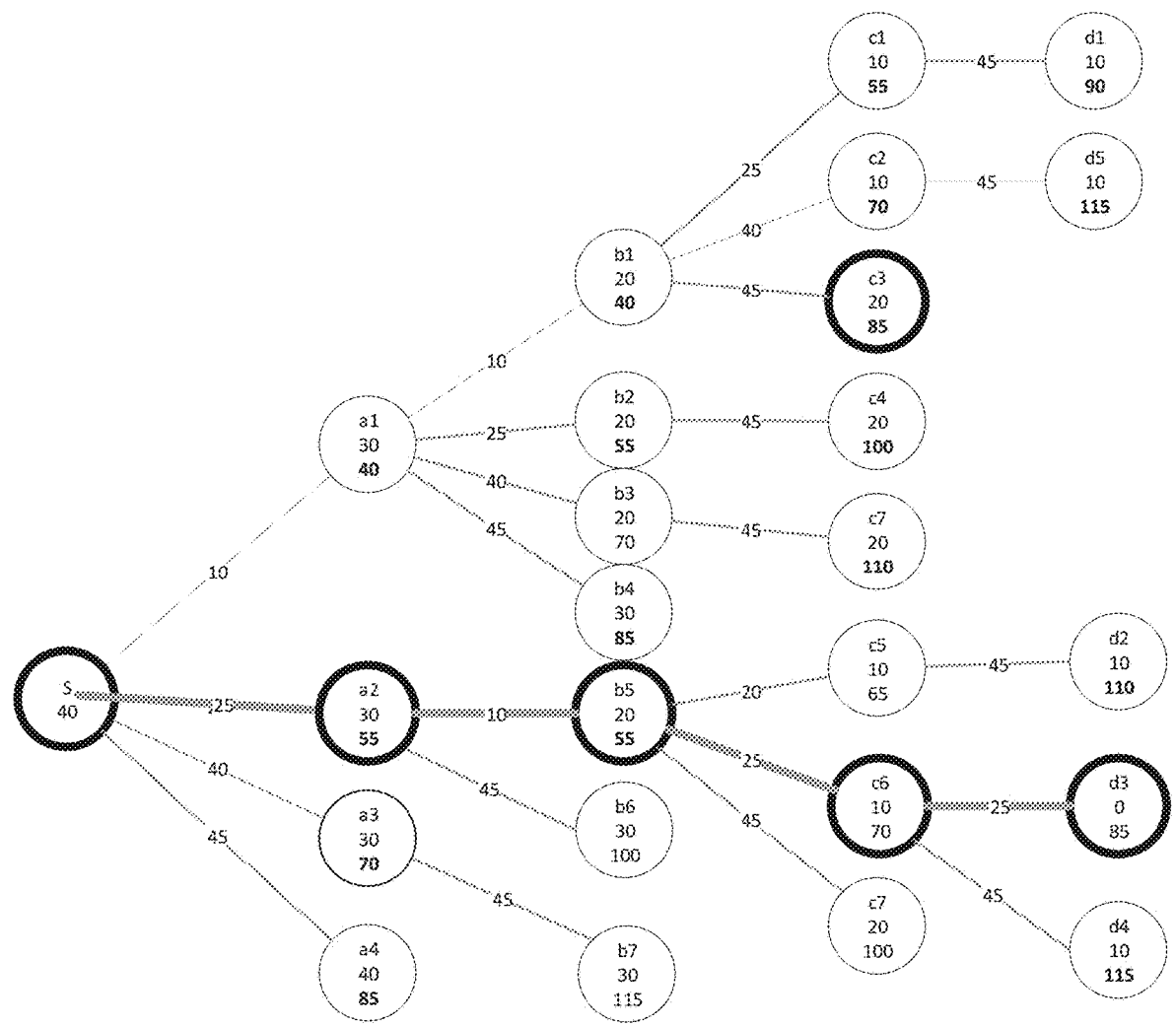

In FIG. 20 the algorithm has deemed b7, which means waiting for Boom2, unattractive and moves on to the next most attractive node d3. c3 would have been equally attractive, but d3 is selected because it is the latest. This node d3 is now the goal node, and algorithm finishes the searching.

The highlighted path is now the created plan:
1) Drill hole B with the Boom1,
2) Drill hole D with the Boom2,
3) Drill hole A with the Boom1, and
4) Drill hole C with the Boom2.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. An apparatus for planning a drilling sequence for a rock drilling rig comprising:

at least two drilling booms, which are provided with drilling units for drilling drill holes to a face of a rock surface;

at least one control unit including a processor arranged to execute a drilling sequence planning program, the control unit being provided with a drilling pattern including drill hole data on drill holes to be drilled, wherein the drill hole data has at least position data of starting points of the drill holes to be drilled, the control unit also being provided with data on drilling booms, wherein the data on drilling booms includes data on a number of the booms, reach of the booms, and further, positions of the booms relative to the drilling pattern, wherein execution of the drilling sequence planning program in the processor of the apparatus is configured to generate a drilling sequence for the provided drilling pattern, wherein the drilling sequence includes data on a drilling order of the drill holes and selection of a boom for drilling each drill hole, the control unit being configured to search several drilling steps further for each drilling unit, and based on that, being configured to produce several possible drilling sequence scenarios each of which defines a different drilling order, drilling unit selection and transfers of the drilling units between neighboring drill holes, wherein the control unit is provided with at least one data element including pre-determined rules for defining cost values for several possible actions of the drilling steps, the control unit being configured to detect actions required by the drilling steps of the searched drilling sequence scenarios and is configured to calculate total costs for the searched drilling sequence scenarios based on the pre-determined rules, and wherein the control unit is configured to select one drilling sequence scenario of the examined scenarios having the lowest total cost for the several following drilling steps.

2. The apparatus as claimed in claim 1, wherein the control unit is further configured to:
execute the search several times for the drilling pattern during the drilling process in order to seek several new drilling sequence scenarios;
calculate the total costs for found new drilling sequence scenarios; and
update the selection of one drilling sequence scenario to be implemented next by selecting one drilling sequence scenario having a lowest total cost from the several new drilling sequence scenarios.

3. The apparatus as claimed in claim 2, wherein the control unit is configured to dynamically update the disclosed searching and updating processes in response to detecting at least one of the following incidences: drilling of any drill hole is completed; drilling of any drill hole has been interrupted or failed; an operator has executed a manual control step; a drilling unit has failed; the drilling pattern has been updated; and the rules of the data element have been updated.

4. The apparatus as claimed in claim 2, wherein the apparatus is configured to display the found drilling sequence scenarios as a graph on a display device by showing found paths as lines between the drill holes.

5. The apparatus as claimed in claim 1, wherein the control unit is configured to compare, during a cost calculation process, intermediate costs of an unfinished cost calculation of the drilling sequence scenarios to the already calculated total costs of drilling sequence scenarios, and is configured to interrupt the unfinished cost calculation of such drilling sequence scenarios when the intermediate costs already exceed the previously calculated total costs to avoid redundant calculation.

6. The apparatus as claimed in claim 1, wherein the apparatus implements a graph and tree search algorithm, and the least one data element includes heuristic rules defining at least costs for transitions of the drilling units.

7. The apparatus as claimed in claim 1, wherein the control unit is provided with an A* computer algorithm for searching possible transitions between the drill holes of the drilling pattern, the control unit being provided with heuristic rules for the algorithm, the algorithm being configured to calculate costs for found transitions based on the heuristic rules, generate several drilling sequence scenarios and to calculate total costs for at least part of the generated drilling sequence scenarios, and select the scenario to be executed next, which has the lowest costs for several further drill holes.

8. The apparatus as claimed in claim 1, wherein the control unit is provided with at least one data element including pre-determined rules for defining cost values for transfers between selectable neighboring drill holes.

9. The apparatus as claimed in claim 1, wherein the apparatus is provided with data on a maximum allowable distance for searchable neighboring drill holes, whereby the generated drilling sequence scenarios have only transitions lengths that are shorter than the maximum allowable distance.

10. The apparatus as claimed in claim 1, wherein the control unit is provided with data on a selection of initial drill holes determined for each drilling boom, the control unit being configured to search for each boom possible transfer from the selection of initial drill holes to following neighboring drill holes within reach of the booms and repeating the search in several following rounds until all the drill holes of the face drilling pattern are included and the searching is terminated.

11. The apparatus as claimed in claim 1, wherein the apparatus is configured to generate the drilling sequence for remaining drill holes of the drilling pattern simultaneously during the drilling, and the at least one control unit generating the drilling sequence is located on the rock drilling rig.

12. A rock drilling rig comprising:
a movable carrier;
two or more drilling booms provided with drilling units, which include feed beams and rock drilling machines supported by the feed beams;
at least one control unit; and
an apparatus in accordance with claim 1, the apparatus being arranged for planning a drilling sequence.

13. A method of planning a drilling sequence for a rock drilling rig including a plurality of drilling booms intended for drilling, the method comprising:
executing the planning in at least one control unit;
providing the control unit with a drilling pattern including drill hole data on drill holes to be drilled;
providing the control unit with data on the drilling booms;
executing a drilling sequence planning program in a processor of the control unit and generating a drilling sequence for the provided drilling pattern, wherein the drilling sequence includes data on a drilling order of the drill holes and selection of a boom of the plurality of booms for drilling each drill hole;
searching several drilling steps further for each drilling boom for producing several possible drilling sequence scenarios each of which defining a different drilling order, drilling unit selection and transfers of the drilling booms between neighboring drill holes;

providing the control unit with at least one data element having pre-determined rules for defining cost values for several possible actions of the drilling steps;

detecting actions required by the drilling steps of the searched drilling sequence scenarios and calculating total costs for the searched drilling sequence scenarios based on the rules; and selecting one drilling sequence scenario of the examined scenarios having the lowest total cost for the several following drilling steps.

14. A computer program product for planning a drilling sequence, wherein the computer program product has computer executable code configured to execute the method of claim 13 when being run on a computer or a data processing device.

* * * * *